(12) United States Patent
Ronski et al.

(10) Patent No.: US 10,293,950 B2
(45) Date of Patent: May 21, 2019

(54) AIRCRAFT ENGINE CASE SHOCK MOUNT

(71) Applicant: United Technologies Corporation, Hartford, CT (US)

(72) Inventors: Mark Ronski, Tolland, CT (US); Todd A. Davis, Tolland, CT (US); Ernest Boratgis, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 653 days.

(21) Appl. No.: 14/951,674

(22) Filed: Nov. 25, 2015

(65) Prior Publication Data

US 2016/0083101 A1 Mar. 24, 2016

Related U.S. Application Data

(63) Continuation of application No. PCT/US2014/054022, filed on Sep. 4, 2014.

(60) Provisional application No. 61/879,829, filed on Sep. 19, 2013.

(51) Int. Cl.
| | |
|---|---|
| *F02C 7/32* | (2006.01) |
| *B64D 27/26* | (2006.01) |
| *F16F 9/10* | (2006.01) |
| *F02C 7/36* | (2006.01) |
| *F16F 9/19* | (2006.01) |

(52) U.S. Cl.
CPC ............... *B64D 27/26* (2013.01); *F02C 7/32* (2013.01); *F02C 7/36* (2013.01); *F16F 9/10* (2013.01); *F16F 9/19* (2013.01); *B64D 2027/262* (2013.01); *F05D 2220/32* (2013.01); *F05D 2260/96* (2013.01); *F16F 2238/04* (2013.01)

(58) Field of Classification Search
CPC ......... F02C 7/32; Y10T 74/2186–2189; F16H 57/025
See application file for complete search history.

(56) References Cited

U.S. PATENT DOCUMENTS

| | | | |
|---|---|---|---|
| 2,071,701 | A | 2/1937 | Gustave |
| 2,667,348 | A | 1/1954 | Frye et al. |
| 2,951,395 | A | 9/1960 | Kurti et al. |
| 2,978,869 | A | 4/1961 | Hiscock et al. |
| 3,269,118 | A | 8/1966 | Benedict et al. |

(Continued)

OTHER PUBLICATIONS

International Preliminary Report on Patentability dated Mar. 22, 2016 in PCT Application No. PCT/US2014/054022.

(Continued)

*Primary Examiner* — Gerald L Sung
*Assistant Examiner* — Rene D Ford
(74) *Attorney, Agent, or Firm* — Snell & Wilmer, L.L.P.

(57) ABSTRACT

The present disclosure relates to shock mounts for turbine engine components. A shock mount may be used to mount an accessory gearbox to an engine case. The shock mount may allow free thermal expansion, while providing damping and stiffness in response to vibrations. The shock mount may include a cylinder filled with fluid, and a piston telescopically moveable within the cylinder. The piston may be coupled to an orifice plate. The orifice plate may include orifices through which the fluid may flow in response to compression or extension of the shock mount. The interaction of the fluid and the orifice plate may resist rapid compression or extension of the shock mount while allowing relatively slow compression or extension of the shock mount.

10 Claims, 3 Drawing Sheets

(56) References Cited

U.S. PATENT DOCUMENTS

| | | |
|---|---|---|
| 6,212,974 B1 | 4/2001 | Duyn |
| 6,640,941 B2 | 11/2003 | Taylor |
| 7,878,448 B2 | 2/2011 | Olsen et al. |
| 2013/0160459 A1 | 6/2013 | Thies et al. |

OTHER PUBLICATIONS

International Search Report and Written Opinion dated Dec. 12, 2014 in Application No. PCT/US2014/054022.

AIRCRAFT ENGINE CASE SHOCK MOUNT

CROSS-REFERENCE TO RELATED APPLICATIONS

This application is a continuation of, claims priority to and the benefit of, PCT/US2014/054022 filed on Sep. 4, 2014 and entitled "AIRCRAFT ENGINE CASE SHOCK MOUNT," which claims priority from U.S. Provisional Application No. 61/879,829 filed on Sep. 19, 2013 and entitled "AIRCRAFT ENGINE CASE SHOCK MOUNT." Both of the aforementioned applications are incorporated herein by reference in their entirety.

FIELD OF INVENTION

The present disclosure relates generally to turbine engines, and more particularly, to mounts for turbine engine components.

BACKGROUND OF THE INVENTION

Conventional aircraft engines, such as gas turbine engines, typically include various components mounted to an engine case. For example, an accessory gearbox may be mounted to the engine case. During engine operation, the engine and engine case may grow due to thermal expansion as the engine heats up. Heavy accessories coupled to the accessory gearbox may cause strain on the accessory gearbox and mounts. Additionally, engine vibration may produce strain on the mounts and accessory gearbox, which may lead to damage or failure of the mounts and other components.

SUMMARY OF THE INVENTION

A shock mount is disclosed. The shock mount may comprise a cylinder configured to receive a viscous fluid within the cylinder. The shock mount may further comprise a piston configured to telescopically move within the cylinder. The shock mount may further comprise a plate coupled to the piston. The plate may be configured for translation relative to the cylinder and for operative association with fluid within the cylinder. The shock mount may be configured to be coupled to an engine case of a gas turbine engine. A resistance to displacement of the plate relative to the cylinder may be proportional to a rate of displacement of the plate relative to the cylinder.

A system for mounting a gearbox to an engine case is disclosed. The system may include a side hanger link and a shock mount comprising a cylinder configured to receive a fluid and a piston configured to telescopically move within the cylinder and change a length of the shock mount. The side hanger link may be coupled to the gearbox and the engine case. The shock mount may be coupled to the engine case and at least one of the gearbox and an accessory coupled to the gearbox. The shock mount may be configured to resist displacement in response to vibration. The fluid may provide stiffness and damping capability to the shock mount.

A method of mounting a gearbox to an engine case is disclosed. The method may include coupling a shock mount to the engine case and the gearbox. The shock mount may comprise a cylinder configured to receive a fluid and a piston configured to telescopically move within the cylinder and change a length of the shock mount. The method may include heating the engine case, whereby heating the engine case causes the piston to telescopically move within the cylinder. Heating the engine case may comprise operating a gas turbine engine within the engine case.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized, and that logical and mechanical changes may be made without departing from the spirit and scope of the inventions. Thus, the detailed description herein is presented for purposes of illustration only and not for limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
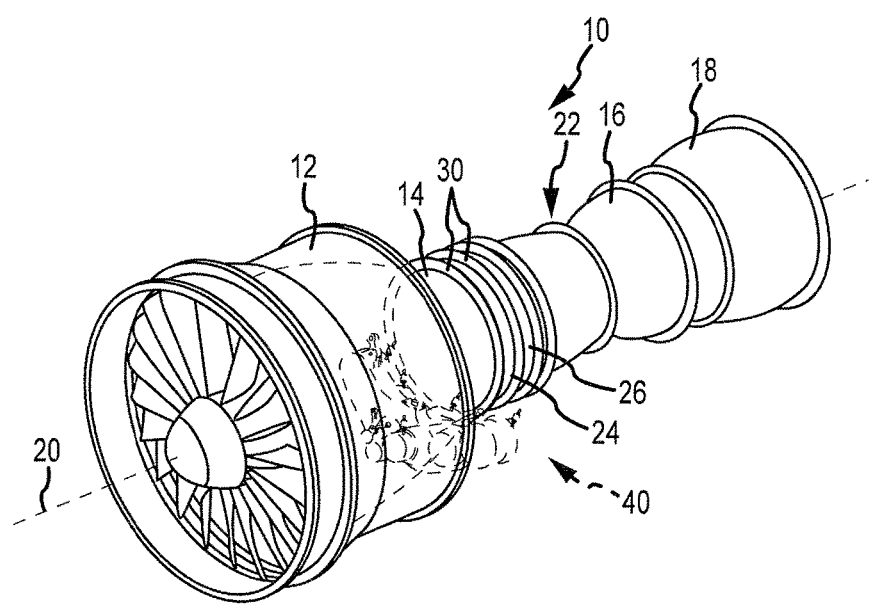
FIG. 1 illustrates a perspective view of a gas turbine engine showing a gearbox mounted to an engine case according to various embodiments of the disclosure.

Referring to FIG. 1, a gas turbine engine 10, such as a turbofan engine, is illustrated according to various embodiments. Gas turbine engine 10 may include a fan section 12, a compression section 14, a combustion section 16, and a turbine section 18. The compression section 14 and the turbine section 18 may each contain one or more stages of a compressor and turbine (not shown) which rotate about an engine central axis 20. The various components may be circumscribed by an essentially cylindrical engine case 22 which serves as a main structural support for the engine. Engine case 22 may be constructed of individual case sections, such as case sections 24 and 26, which may be coupled together at flanges such as flange 30. Accessory gearbox 40 may be mounted to compression section 14. However, in various embodiments, gearboxes may be located at any location throughout gas turbine engine 10. Accessory gearbox 40 may drive various accessories, such as fuel pumps, generators, oil pumps, hydraulic pumps, air compressors, engine starters, etc.

The forward-aft positions of gas turbine engine 10 lie along engine central axis 20, which may also be referred to as axis of rotation 20. For example, fan section 12 may be referred to as forward of turbine section 18 and turbine section 18 may be referred to as aft of fan section 12. Typically, during operation of gas turbine engine 10, air flows from forward to aft, for example, from fan section 12 to turbine section 18. As air flows from fan section 12 to the more aft components of gas turbine engine 10, engine central axis 20 may also generally define the direction of the air stream flow.

Figure 2:
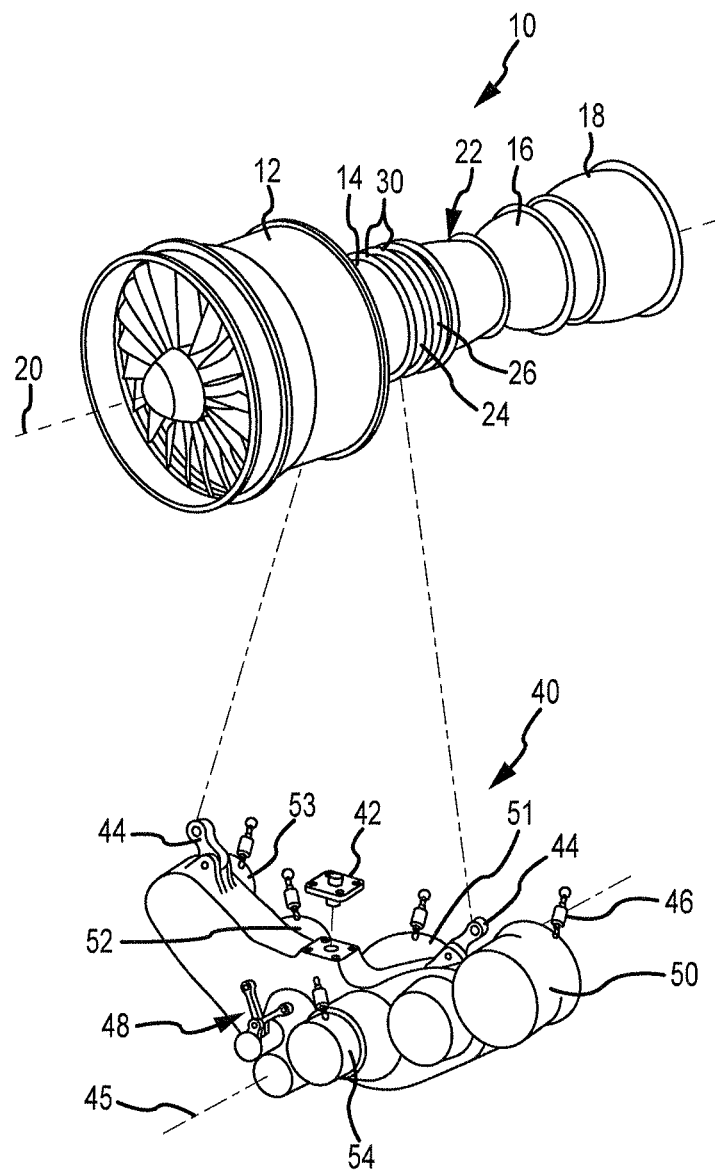
FIG. 2 illustrates a perspective view of a gas turbine engine with an exploded view of a gearbox according to various embodiments.

Referring to FIG. 2, accessory gearbox 40 may be mounted to engine case 22 by side hanger links 44 and antisway bracket 42. In various embodiments, accessory gearbox 40 may also be mounted to engine case 22 by layshaft link 48 located axially forward of side hanger links 44 and antisway bracket 42 as defined by forward-aft line 45. Antisway bracket 42 may prevent lateral movement of accessory gearbox 40. In various embodiments, side hanger links 44 and layshaft link 48 may comprise rigid mounts which couple accessory gearbox 40 to engine case 22 by inflexible, immobile connections that may transmit case deflections and distortions to accessory gearbox 40. In various embodiments, side hanger links 44 and/or layshaft link 48 may comprise spherical bearings.

In accordance with various embodiments of the present disclosure, accessory gearbox 40 and/or the accessories coupled to accessory gearbox 40 may be further mounted to engine case 22 by shock mounts 46. Shock mounts 46 may allow for free thermal expansion of engine case 22 or accessory gearbox 40 by increasing or decreasing a length associated with shock mounts 46, and thus may further support accessory gearbox 40 and/or the accessories coupled to accessory gearbox 40 without being subjected to stresses from thermal expansions, and may therefore be located in locations where rigid mounts could not be utilized. For example, in FIG. 2, shock mounts 46 are shown mounted to oil pump 50, integrated drive generator 51, starter 52, hydraulic pump 53, and deoiler 54. However, in various embodiments, shock mounts 46 may additionally or alternatively be mounted to any accessory and to any other suitable locations on accessory gearbox 40. In that regard, shock mounts 46 may be utilized at various locations around engine case 22, and may provide support and damping for any component coupled to engine case 22. In various embodiments, at least one of side hanger links 44 and layshaft link 48 may be replaced with a shock mount.

Figure 3:
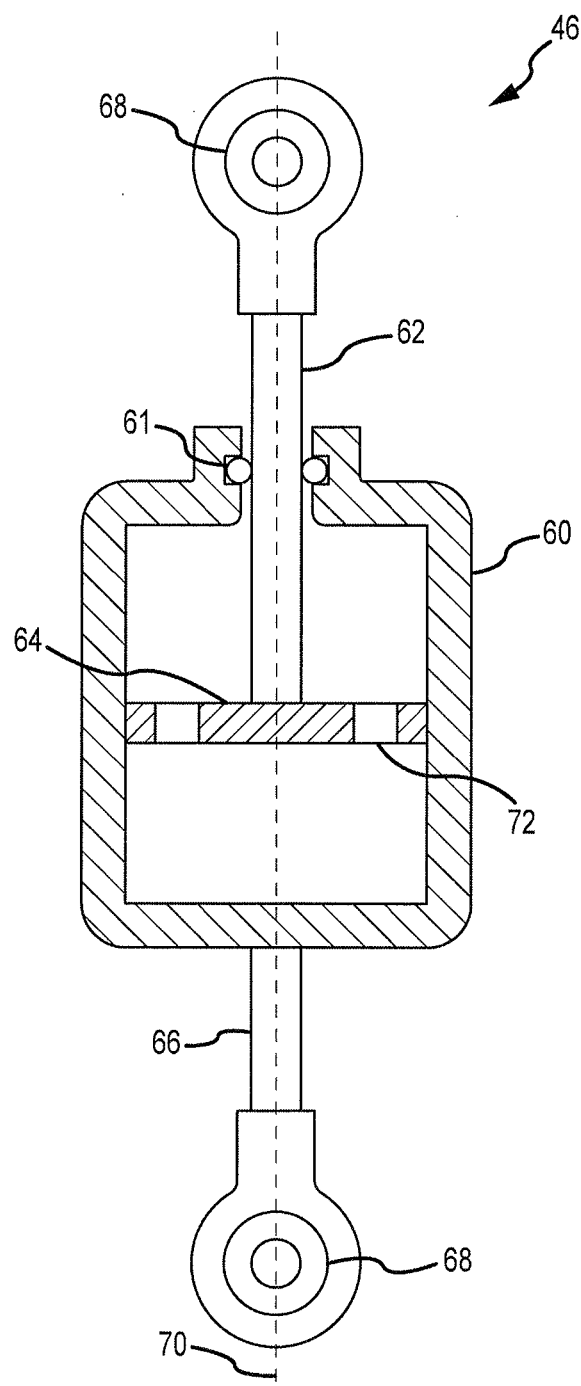
FIG. 3 illustrates a cross-section view of a shock mount according to various embodiments.

Referring to FIG. 3, a cross section view of a shock mount 46 is illustrated according to various embodiments. Shock mount 46 may comprise a cylinder 60, a piston 62, orifice plate 64, support rod 66, and spherical bearings 68. Cylinder 60 may be filled with a viscous fluid, such as hydraulic oil, or any other viscous fluid. The viscosity of the fluid may vary based on the desired properties for shock mounts 46, and in various embodiments, fluid with any viscosity may be used. However, in various embodiments, the fluid may have a viscosity of 0.1-1.0 Pascal-seconds at room temperature. In various embodiments, the fluid must be capable of operation in the shock mount 46 at temperatures up to 1,200° F. (650° C.) or higher without coking (e.g., without causing solid residue to build up in the fluid under high temperatures). In various embodiments, the fluid must also be capable of operation at temperatures as low as −60° F. (−50° C.). Cylinder 60 may receive piston 62 in a manner that permits relative telescoping movement between cylinder 60 and piston 62 to absorb and dampen shock forces being transmitted between accessory gearbox 40 and engine case 22. Piston 62 may slidingly engage seal 61, such that seal 61 prevents the fluid inside cylinder 60 from escaping cylinder 60. Piston 62 may enter cylinder 60 through an opening defined at a first end of cylinder 60, and support rod 66 may be coupled to a second end of cylinder 60 opposite the first end as shown. In various embodiments, piston 62 and support rod 66 may be collinear, such that piston 62 and support rod 66 share a same axis 70.

Piston 62 may be coupled to orifice plate 64. Orifice plate 64 may slidingly engage cylinder 60. In various embodiments, the outer periphery of orifice plate 64 may form a seal with cylinder 60 while translating relative thereto. However, in various embodiments, orifice plate 64 may be configured to allow fluid to pass between the outer periphery of orifice plate 64 and cylinder 60, through an annular space defined therebetween. In various embodiments, orifice plate 64 may comprise at least one orifice 72. However, in various embodiments, orifice plate 64 may comprise any number of orifices 72 located throughout orifice plate 64. The number and size of orifices 72 defined by orifice plate 64 may be varied to create different stiffness and damping properties of shock strut 46. For example, as the number or size of orifices 72 increases, the stiffness of shock mount 46 may decrease. Similarly, as the viscosity of the fluid provided within cylinder 60 increases, the stiffness of shock mount 46 may increase.

In operation, compression of shock mount 46 causes piston 62 to telescopically move within cylinder 60 toward support rod 66. Conversely, extension of shock mount 46 causes piston 62 to telescopically move within cylinder 60 away from support rod 66. As used herein, "displacement" of shock mount 46 may refer to either compression or extension of shock mount 46 (e.g., displacement of piston 62 or orifice plate 64 relative to cylinder 60). It will be appreciated that shock mount 46 may dissipate energy by passing the fluid through orifices 72 and/or around outer periphery of orifice plate 64 between orifice plate 64 and cylinder 60 so that as shock mount 46 is compressed or extended, its rate of motion (e.g., the rate of motion of piston 62 or orifice plate 64 relative to cylinder 60) is limited by, for example, the damping action from the interaction of orifices 72 and the fluid.

In response to thermal expansion or compression of engine case 22 or accessory gearbox 40, a compression or extension force may be applied to shock mount 46. The compression or extension may occur relatively slowly over an extended time period. As shock mount 46 slowly compresses or extends, the fluid may pass through orifices 72 with little resistance.

In contrast, in response to rapid compression or extension forces applied to shock mount 46, such as from high frequency vibrations caused by gas turbine engine 10, the viscosity of the fluid may resist rapid telescoping movement of piston 62 relative to cylinder 60 along axis 70. Thus, shock mount 46 may allow relative movement between accessory gearbox 40 and engine case 22 due to thermal expansion, yet prevent relative movement between accessory gearbox 40 and engine case 22 due to vibration or other rapid movements. As the rate of displacement (e.g., the rate of change in length) of shock mount 46 increases, the resistance to displacement of shock mount 46 increases proportionally to the rate of displacement due to the interaction between the fluid and the orifice plate 64.

Shock mount 46 may be mounted to accessory gearbox 40 and/or engine case 22 via spherical bearings 68. The use of spherical bearings 68 may control the loading and the direction of movement of piston 62. Spherical bearings 68 may keep shock mount 46 aligned with the direction of force being transmitted between accessory gearbox 40 and engine case 22. Thus, bending and shear loading on shock mount 46 may be prevented.

In various embodiments, the fluid provided inside cylinder 60 may provide both stiffness and damping to shock mount 46. Thus, in accordance with various embodiments, no spring is required in order for shock mount 46 to provide stiffness. However, in various embodiments, a spring may be operatively coupled to cylinder 60 and/or piston 62 in order to provide additional stiffness and/or damping to shock mount 46.

It will be appreciated that various structural benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the structural benefits and advantages, as well as any other elements that may cause any benefit or advantage to occur or become more pronounced are not to be construed as critical, required, or essential features or elements of the various embodiments of the disclosure. In the appended claims herein, reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatuses are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A mounting system:
   an engine case;
   a gearbox having circumferential ends with respect to a longitudinal axis of the engine case;
   at least one rigid mount having a side hanger link coupled to one of the circumferential ends of the gearbox and the engine case; and
   a shock mount coupled to the gearbox and the engine case, the shock mount comprising a cylinder configured to receive a fluid and a piston configured to telescopically move within the cylinder and change a length of the shock mount.

2. The mounting system of claim 1, wherein the shock mount is configured to be coupled to the engine case and at least one of the gearbox and an accessory coupled to the gearbox.

3. The mounting system of claim 1, wherein the shock mount is configured to operate at temperatures up to 1,200° F.

4. The mounting system of claim 1, wherein the shock mount is configured to displace in response to thermal expansion of the engine case.

5. The mounting system of claim 1, wherein the shock mount is configured to resist displacement in response to vibration.

6. The mounting system of claim 1, wherein the shock mount further comprises an orifice plate which slidingly engages the cylinder.

7. The mounting system of claim 1, wherein the cylinder houses the fluid and the fluid provides stiffness and damping capability to the shock mount.

8. The mounting system of claim 1, wherein the shock mount contains no spring.

9. The mounting system of claim 1, wherein the shock mount is coupled to the gearbox via a spherical bearing.

10. The mounting system of claim 1, wherein a resistance to displacement of the shock mount is proportional to a rate of displacement of the shock mount.

* * * * *